United States Patent [19]

Adriance et al.

[11] Patent Number: 5,386,962
[45] Date of Patent: Feb. 7, 1995

[54] SHOCK AND VIBRATION ABSORBING MOUNTS

[75] Inventors: Kyle Adriance, St. Charles; Charles D. Kimbro, O'Fallon; Douglas A. Webb, St. Peters, all of Mo.

[73] Assignee: Puritan Bennett Corporation, St. Charles, Mo.

[21] Appl. No.: 151,738

[22] Filed: Nov. 15, 1993

[51] Int. Cl.⁶ ............................................. F16M 13/00
[52] U.S. Cl. ..................................... 248/624; 248/638
[58] Field of Search ............... 248/624, 600, 601, 618, 248/623, 632, 638; 108/20; 267/141, 140.2

[56] References Cited

U.S. PATENT DOCUMENTS

| | | | |
|---|---|---|---|
| 2,099,375 | 11/1937 | Seward | 248/624 X |
| 2,173,342 | 9/1939 | Rosenzweig | 248/624 |
| 2,270,335 | 1/1942 | Parkinson | 267/140.2 |
| 2,407,804 | 9/1946 | Winchel | 248/632 X |
| 2,678,796 | 5/1954 | Roy | 267/141 X |
| 2,892,482 | 6/1959 | Beoletto | 248/624 X |
| 3,355,131 | 11/1967 | Fordeck | 248/624 X |
| 3,917,201 | 11/1975 | Roll | 108/20 |
| 4,598,503 | 7/1986 | Berger | 248/624 X |

FOREIGN PATENT DOCUMENTS 492077  2/1930  Germany ................. 248/624

*Primary Examiner*—J. Franklin Foss
*Attorney, Agent, or Firm*—Paul M. Denk

[57] ABSTRACT

A mount for a compressor or the like which sits on a base includes a top surface which is securable to the base. The top surface defines a well having a floor. An opening is formed in the bottom of the floor and a shaft extends from beneath the well floor to above the upper surface. The shaft includes a lower flange positioned below the well floor and an upper flange positioned above the top surface. A spring is positioned between said well floor and the top flange to absorb vibrations and any resulting shock produced by the compressor. A pair of upwardly extending generally perpendicular walls are provided on the upper surface to prevent the spring from engaging the upper surface or deflecting excessively. The walls and the upper flange are sized such that when the shaft moves with respect to the well, the upper flange will contact the wall before the spring contacts the upper surface or deflects excessively.

7 Claims, 2 Drawing Sheets

SHOCK AND VIBRATION ABSORBING MOUNTS

BACKGROUND OF THE INVENTION

This invention relates to mounts, and in particular, to a mount for use with a compressor or similar devices.

Compressors, or other devices which create a substantial amount of vibrations and shock when used often have spring mounts which mount the device to a base. The spring mounts absorb the vibrations of the device and prevent the device from transferring undesirable vibrations to its base. Such mounts typically consist of helical wire springs mounted between the device and its base. Although such a mount is adequate for isolating vibrations while the compressor or device is operating but stationary, the mount is generally not adequate for absorbing shock and vibration associated with transport, i.e. the compressor is mounted as part of mobile equipment. This transport can cause large displacement of the compressor or device which causes spring fatigue and premature failure. Equipment using springs as shock mounts must typically employ a "lock down" mechanism for transport.

SUMMARY OF THE INVENTION

One object of the present invention is to provide a mount for a compressor or the like.

Another object is to provide such a mount which has restraining means to prevent spring failure due to transport motion, but still allows enough clearance of mount components so as to not allow the components to contact each other, and thus cause noise, during normal, stationary operations of the compressor or like.

Another object is to provide such a mount which will have a longer usable life under normal operating and transport conditions.

Another object is to provide such a mount which is economical to produce.

These and other objects will become apparent to those skilled in the art in light of the following disclosure and accompanying drawings.

A mount for a compressor or the like which sits on a base includes a top surface which is securable to the base. The top surface defines a well having a floor. An opening is formed in the bottom of the floor and a shaft extends from beneath the well floor to above the upper surface. The shaft includes a lower flange positioned below the well floor and an upper flange positioned above the top surface. A spring is positioned between said well floor and the top flange to absorb vibrations produced by the compressor. A pair of upwardly extending generally perpendicular walls are provided on the upper surface to prevent the spring from engaging the upper surface. The walls and the upper flange are sized such that when the shaft moves with respect to the well, the upper flange will contact the wall before the spring contacts the upper surface. Thus, this also prevents the mount from deforming to an unacceptable degree particularly during transit. Because the mount prevents the spring from contacting the upper surface, the spring will not wear or fatigue prematurely and therefore will not break as readily as in prior mounts.

DESCRIPTION OF THE PREFERRED EMBODIMENT

Figure 1:
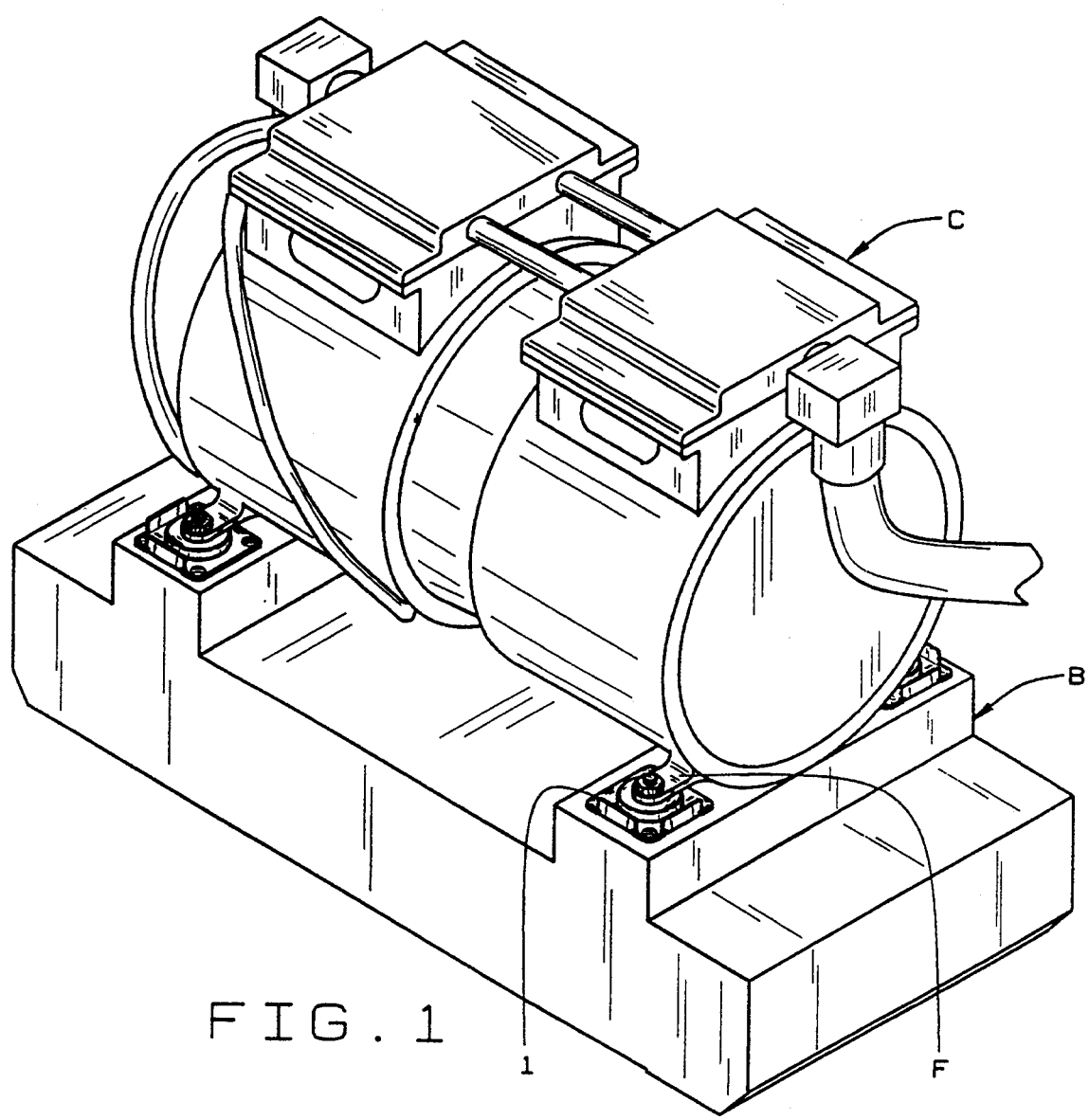
FIG. 1 is a perspective view of a compressor supported on mounts of the present invention.
Figure 2:
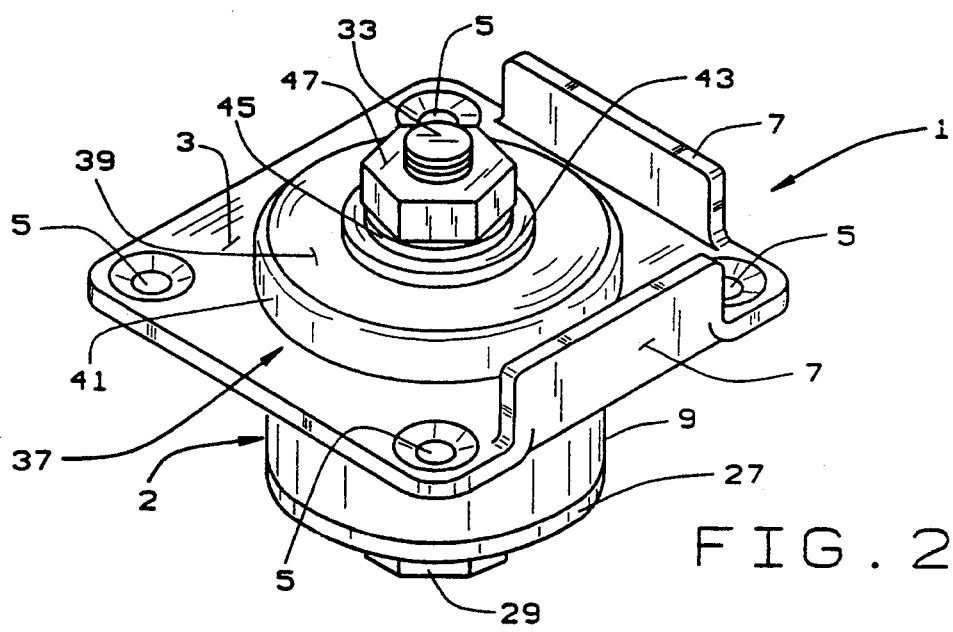
FIG. 2 is a perspective view of a mount of the present invention.
Figure 3:
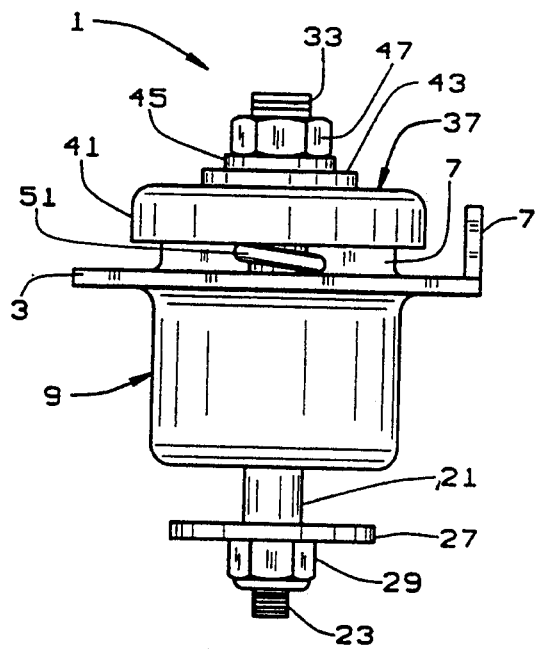
FIG. 3 is a side elevational view of the mount.
Figure 4:
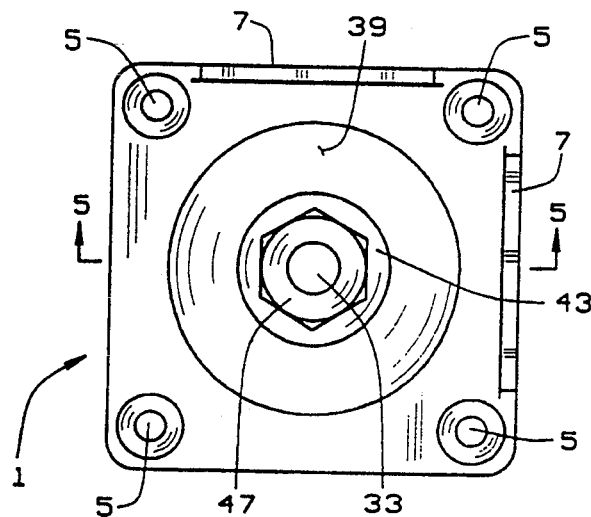
FIG. 4 is a top plan view of the mount.

Turning initially to FIG. 1, a compressor C having legs or feet F is shown mounted to a base B. Feet F of the compressor C are secured to a mount 1 of the present invention. Each foot of the compressor is secured to such a mount. Mount 1 absorbs the vibrations created by the compressor during operation of the compressor so that the compressor does not transfer undesirable vibrations to base B.

Mount 1 includes body 2 having a top surface 3 with mounting holes 5 at its corners. Surface 3 rests on base B and holes 5 receives screws, rivets, bolts, or the like to secure mount 1 to base B. Holes 5 are preferably counter-sunk or beveled so that the top surface of the screw which secures the mount to the base is flush with top surface 3. Top surface 3 is preferably square, but any desired shape could be used. A pair of walls 7 extend upwardly from surface 3 at the periphery thereof. Walls 7 are perpendicular to each other. Although only two walls are shown, more walls could be used.

A well 9 depends from top surface 3. Well 9 has a bottom floor 11 defining central opening 13. Preferably, the floor 11 has an upturned section 15 which surrounds opening 11 and defines a channel 17 with the side wall 19 of well 9.

A shaft 21 extends through opening 13 and above top surface 3. Shaft 21 has a lower, threaded portion 23 which has a smaller diameter than shaft 21 and forms a shoulder 25. A washer 27 is received on portion 23 and seats against shoulder 25. Washer 27 is held in place by a threaded nut 29 and a lock washer 31. Washer 27 has a diameter larger than the diameter of opening 13 and acts as a flange which contacts the bottom of well floor 11 to prevent the shaft from passing upwardly through the well 2. That is, it defines one limit of movement of the shaft with respect to body 2. Other means than a washer may be employed, such as a wide nut, or other means to retain the screw from passing through the opening 13.

An upper portion 33 of the shaft is also threaded. The portion between the lower and upper portions is substantially smooth. Upper portion 33 receives a lower nut 35 on which a washer 37 sits. Nut 35 has a diameter larger than the opening in washer 37 and serves as a flange upon which the washer sits. Washer 37 has a top surface 39 and a downwardly depending circumferential wall 41. A second washer 43 sits on surface 39. A split lock ring 45 sits on washer 43, and a threaded nut 47 secures the washers in place. Washer 39 has a diameter larger than the diameter of well 9 and defines a second limit to the travel of shaft 21. In actual practice, where the mount is installed into, for example, an oxygen concentrator, or compressor, or other instrument, the threaded nut 47 will not be used, but rather, the threaded means 33 will fasten into a threaded foot provided on the compressor, or other instrument, and be rigidly connected thereto, for attachment of the mount to the device, and for suspending it from its base. In addition, it is likely that the washer 43 will also not be used, under routine installation of these mounts to the bottom of any instrument, such as a compressor.

A spring 51 is received on shaft 21 within well 9. The bottom of spring 51 is received in channel 17 and the top of the nut 35 sits on the top of the spring. Spring 51 thus biases upper flange 37 upwardly and acts as a vibration isolator during operation of the compressor. Spring 51 is preferably a conical, helical spring, although other types of springs could be used.

Figure 5:
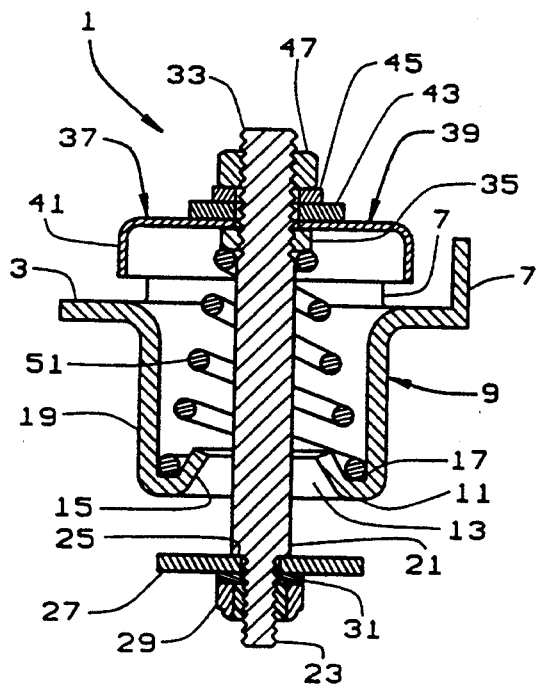
FIG. 5 is a cross-sectional view of the mount in a relaxed position.
Figure 6:
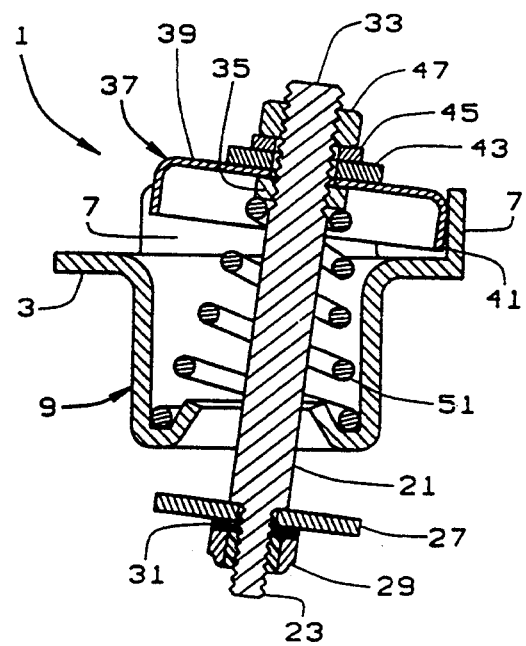
FIG. 6 is a cross-sectional view of the mount in a vibration absorbing position.

The operation of the mount 1 can be seen in FIGS. 5 and 6. The mount supports the compressor or other device, the spring 51 bearing the weight of the compressor. During transport, vibrations and forces of impact of the compressor may make the shaft move considerably with respect to well 9. If such movement occurs, the wall 41 of upper flange or washer 37 contacts wall 7 of surface 3. The washer 37 is sized so that the flange contacts the wall 7 before the spring 51 would contact surface 3. As can be appreciated, this substantially protects spring 51 from undue forces and contact with the surface 3 or otherwise deflect to such a degree to cause premature failure. If spring 51 were to repeatedly contact surface 3 or repeatedly deflect beyond the limits set by the contacting components, spring 51 would prematurely wear and break, making the mount inoperative. Mount 1 can thus lengthen the operating life of the spring and hence the mount. As can be seen in FIG. 1, if the mount has only two walls 7, the mounts 1 are secured to the base B such that walls 7 define a perimeter which surrounds the mounts. If the mounts had four walls, the orientation of the mount of the base would not matter.

Variations within the scope of the appended claims may be apparent to those skilled in the art. For example, the shape of top surface 3 may be altered to any desirable shape. All that is necessary is that the upwardly extending walls 7 be of a sufficient size to protect spring 51. Shaft 21 is shown to be substantially smooth between threaded ends 23 and 33, however, the shaft could be threaded along its entire length. Flange 27 could be locked in place with an upper and lower nut, similarly to flange 37. These variations are merely illustrative.

Having thus described the invention, what is claimed and desired to be secured by Letters Patent is:

1. A mount for a device which sits on a base, the mount being securable to the base and the device sitting on the mount, the mount including:
    a top surface which is securable to a base and defining a well having a floor, said well floor defining an opening;
    a pair of generally perpendicular walls extending upwardly from said top surface;
    a shaft received in said well and extending through said well floor opening and above said upper surface, said shaft including a lower flange forming means position below said well floor and having a diameter greater than said hole, an upper flange positioned above said top surface and having a diameter greater than said well, and a spring position between said well floor and said top flange;
    means for securing said device to said mount above said top flange; and
    said shaft defines an upper shoulder and includes an upper, threaded end extending above said upper shoulder, said upper flange comprising a washer means which sits against said upper shoulder and is held in place by a threaded means.

2. The mount of claim 1 wherein said shaft defines a lower shoulder and includes a lower, threaded end extending below said lower shoulder, said lower flange comprising a washer which sits against said lower shoulder and is held in place by a threaded means.

3. The mount of claim 1 wherein said upper flange includes a threaded means.

4. The mount of claim 1 wherein said mounting means includes said upper threaded end, said upper threaded end being received in said device; said device being secured thereto.

5. The mount of claim 1 wherein said well includes a wall which surrounds said well floor hole, said wall, in conjunction with the wall defining said well, defining a channel.

6. The mount of claim 5 wherein said spring has one end received in said channel.

7. The mount of claim 6 wherein said spring is conical and spiral.

* * * * *